US010910962B2

(12) United States Patent
Cho et al.

(10) Patent No.: US 10,910,962 B2
(45) Date of Patent: Feb. 2, 2021

(54) PERVASIVE POWER GENERATION SYSTEM

(71) Applicants: UNIVERSITY OF SOUTHERN CALIFORNIA, Los Angeles, CA (US); CHEVRON U.S.A. INC., San Ramon, CA (US)

(72) Inventors: Young Cho, Los Angeles, CA (US); Deon Rae, Houston, TX (US); Charlie Webb, Bakersfield, CA (US); Greg LaFramboise, Richmond, CA (US); Lanre Olabinjo, Sugarland, TX (US); Andrew Goodney, Los Angeles, CA (US)

(73) Assignees: University of Southern California, Los Angeles, CA (US); Chevron U.S.A. Inc., San Ramon, CA (US)

( * ) Notice: Subject to any disclaimer, the term of this patent is extended or adjusted under 35 U.S.C. 154(b) by 549 days.

(21) Appl. No.: 13/833,868

(22) Filed: Mar. 15, 2013

(65) Prior Publication Data

US 2014/0111136 A1    Apr. 24, 2014

Related U.S. Application Data

(60) Provisional application No. 61/716,307, filed on Oct. 19, 2012.

(51) Int. Cl.
*H02J 7/00* (2006.01)
*H01M 10/44* (2006.01)
(Continued)

(52) U.S. Cl.
CPC ............. *H02N 11/002* (2013.01); *H02J 7/34* (2013.01); *H02J 7/345* (2013.01)

(58) Field of Classification Search
CPC ............................. H02J 7/0055; H02J 7/0035
(Continued)

(56) References Cited

U.S. PATENT DOCUMENTS 5,726,380 A * 3/1998 Ozutsumi et al. ............ 136/205
6,002,584 A * 12/1999 Messmer et al. ............. 361/690
(Continued)

FOREIGN PATENT DOCUMENTS

FR    2732819    10/1996
JP    2000321361  11/2000
(Continued)

OTHER PUBLICATIONS

International Search Report and Written Opinion from corresponding International Application PCT/US2013/065533, dated Feb. 20, 2014.

*Primary Examiner* — Samuel Berhanu
(74) *Attorney, Agent, or Firm* — Brooks Kushman P.C.

(57) ABSTRACT

A power generation system includes a plurality of energy conversion devices for generating a plurality of power signals based on one or more sensed environmental conditions. The system further includes a plurality of power conditioning circuits each coupled to one or more of the energy conversion devices for receiving the power signals and storing energy in an energy storage system. The system also includes a selection circuit coupled to at least one of the power conditioning circuits and receiving a first input power signal from one of the power conditioning circuits and a second input power signal. The selection circuit is configured to deliver an output power signal representing a selection from between the first and second input power signals based on a relative voltage level of the first and second input power signals. A method of power generation, and associated power module, are also disclosed.

20 Claims, 13 Drawing Sheets

(51) Int. Cl.
*H01M 10/46* (2006.01)
*H02N 11/00* (2006.01)
*H02J 7/34* (2006.01)

(58) Field of Classification Search
USPC .................................................. 320/101, 138
See application file for complete search history.

(56) References Cited

U.S. PATENT DOCUMENTS

| | | | |
|---|---|---|---|
| 6,628,040 | B2 | 9/2003 | Pelrine et al. |
| 6,891,477 | B2 | 5/2005 | Aronstam |
| 6,995,677 | B2 | 2/2006 | Aronstam et al. |
| 7,688,026 | B2 * | 3/2010 | An ................................ 320/111 |
| 7,692,411 | B2 * | 4/2010 | Trainor et al. ................ 320/166 |
| 7,834,263 | B2 | 11/2010 | DeSteese et al. |
| 7,946,120 | B2 | 5/2011 | Bell et al. |
| 7,957,708 | B2 | 6/2011 | Karschnia et al. |
| 8,704,494 | B2 * | 4/2014 | LoCascio ............. H02J 7/0052 320/101 |
| 9,729,145 | B2 * | 8/2017 | Sbuell ................ H03K 17/693 |
| 2006/0120001 | A1 * | 6/2006 | Weber et al. ................. 361/103 |
| 2007/0096564 | A1 | 5/2007 | Maeda |
| 2008/0078434 | A1 | 4/2008 | Chakraborty |
| 2008/0083445 | A1 | 4/2008 | Chakraborty |
| 2008/0083446 | A1 | 4/2008 | Chakraborty et al. |
| 2008/0218970 | A1 * | 9/2008 | Kehret et al. ................ 361/699 |
| 2009/0083556 | A1 * | 3/2009 | Zimek et al. ................ 713/310 |
| 2009/0301539 | A1 | 12/2009 | Watts |
| 2010/0044704 | A1 * | 2/2010 | Male et al. .................... 257/49 |
| 2010/0101621 | A1 | 4/2010 | Xu |
| 2010/0132818 | A1 | 6/2010 | Dell et al. |
| 2010/0186794 | A1 | 7/2010 | Chen et al. |
| 2010/0212713 | A1 | 8/2010 | Sasaki et al. |
| 2011/0172847 | A1 * | 7/2011 | Chen ........................ G05F 1/67 700/298 |
| 2011/0209744 | A1 | 9/2011 | Hu |
| 2012/0030489 | A1 * | 2/2012 | Patil ......................... G06F 1/26 713/323 |
| 2012/0048325 | A1 | 3/2012 | Matsuo |
| 2012/0161792 | A1 * | 6/2012 | Ikeda ................. G01R 27/2605 324/658 |
| 2012/0233907 | A1 * | 9/2012 | Pattison et al. ................. 43/124 |
| 2012/0292993 | A1 * | 11/2012 | Mettler ................ H02J 7/0055 307/25 |
| 2013/0007489 | A1 * | 1/2013 | Unnikrishnan ....... G06F 1/3209 713/320 |
| 2013/0144627 | A1 * | 6/2013 | Li ........................... G06F 3/165 704/270 |
| 2013/0200728 | A1 * | 8/2013 | Liu .......................... G06F 1/26 307/130 |
| 2013/0257350 | A1 * | 10/2013 | Yen ..................... H01M 10/443 320/107 |
| 2014/0042959 | A1 * | 2/2014 | Culp .................... H02J 7/00711 320/107 |
| 2014/0232193 | A1 * | 8/2014 | Dien ...................... H02M 1/34 307/46 |

FOREIGN PATENT DOCUMENTS

| | | |
|---|---|---|
| JP | 2006157048 | 6/2006 |
| JP | 2011101460 | 5/2011 |

* cited by examiner

PERVASIVE POWER GENERATION SYSTEM

CROSS-REFERENCE TO RELATED APPLICATIONS

The present application claims priority from U.S. Provisional Patent Application No. 61/716,307, filed on Oct. 19, 2012, the disclosure of which is hereby incorporated by reference in its entirety.

TECHNICAL FIELD

The present disclosure relates generally to power generation, and in particular to a modular, pervasive power generation system.

BACKGROUND

Maximizing production efficiency in an oil field requires remote surveillance and control of wells, pipelines, and other oil field equipment. Commercially available equipment (e.g., wireless sensors, remote terminal units (RTUs), routers) can be used to perform these tasks. For example, data can be collected in one location such as by using flow meters, pressure gauges, or other data sensing or recording devices and then sent to a second location using a wireless telemetry transceiver. However, widespread deployment of such remote surveillance and control is currently limited by the need for reliable power sources to operate these devices. In particular, existing methods for generating power (e.g., batteries, photovoltaic or solar panels, wired power sources, etc.) are often impractical in remote areas (e.g., surface, subterranean, subsea, etc.) where infrastructure is lacking or can be cost prohibitive as they require significant material and costs to implement and maintain. For example, such systems may require periodic maintenance and/or replacement (in the case of batteries) or may be subject to theft (in the case of solar panels or equivalent systems).

Accordingly, there continues to be a need for electrical power sources to operate remote surveillance and control equipment.

SUMMARY

In general, a power generation system is described that includes a plurality of energy conversion devices for generating a plurality of power signals based on one or more sensed environmental conditions. The power generation system also includes a plurality of power conditioning circuits, each coupled to one or more of the energy conversion devices, for receiving the power signals and storing energy in an energy storage system. The power generation system further includes a selection circuit coupled to at least one of the power conditioning circuits. The selection circuit receives a first input power signal from one of the power conditioning circuits and a second input power signal, the selection circuit configured to deliver an output power signal representing a selection from between the first and second input power signals based on a relative voltage level of the first and second input power signals.

In other embodiments, the system further includes a specialized bridge coupled to at least one of the power conditioning circuits for enabling a reversible potential difference, an energy storage system, and a programmable output circuit.

In another aspect of the present disclosure, a power module is disclosed that includes an environmentally-sealed housing having an interior volume. The power module includes a plurality of circuit boards positioned in a stacked arrangement and electrically interconnected. Each of the plurality of circuit boards includes a power conditioning circuit coupled to one or more energy conversion devices, the power conditioning circuit configured to receive power signals from the one or more energy conversion devices and store power in a rechargeable energy storage system. Each of the plurality of circuit boards also includes a selection circuit coupled to a power signal of the power conditioning circuit and to a second power signal. The selection circuit generates an output power signal representing a selection from between the power signal of the power conditioning circuit and the second power signal based on a relative voltage level of the power signal and the second power signal.

In yet another aspect of the present invention, a power generation method includes the steps of generating a plurality of power signals based on one or more sensed environmental conditions; selecting, from the power signals, a first output signal corresponding to the one of the power signals having the greatest power level of the plurality of power signals; and selectively switching to a second output signal when the first output signal is no longer the one of the power signals having the greatest power level of the plurality of power signals.

DETAILED DESCRIPTION

The present disclosure is directed to a power generation system that is capable of generating electric power for operating equipment in remote areas. For example, the power generation system can be utilized in oil fields to generate power for operation of remote surveillance and control equipment. The power generation system is considered to be pervasive, as it is capable of communicating information in real-time to various locations. For example, the power generation system can be connected and constantly available by use of wireless technologies to communicate information over a network. Such information can include, but is not limited to, data generated from equipment (e.g., flow meters, pressure gauges, data sensing devices, data recording devices) that is being powered via the power generation system. The power generation system as discussed herein provides for a scalable, redundant power source that harvests power from any of a variety of types of environmental conditions, such as a temperature differential, while not requiring periodic service or replacement.

In embodiments, the power generation system can be used as a primary source of power, or as a secondary power source utilized to extend or recharge one or more batteries used to supply power for operating equipment in remote areas. "Secondary power source" is understood to broadly encompass any and all applications as secondary, tertiary or otherwise back-up power source.

In embodiments, information is transmitted from a remote user to control operation of the power generation system including the equipment that is powered via the power generation system.

Figure 1:
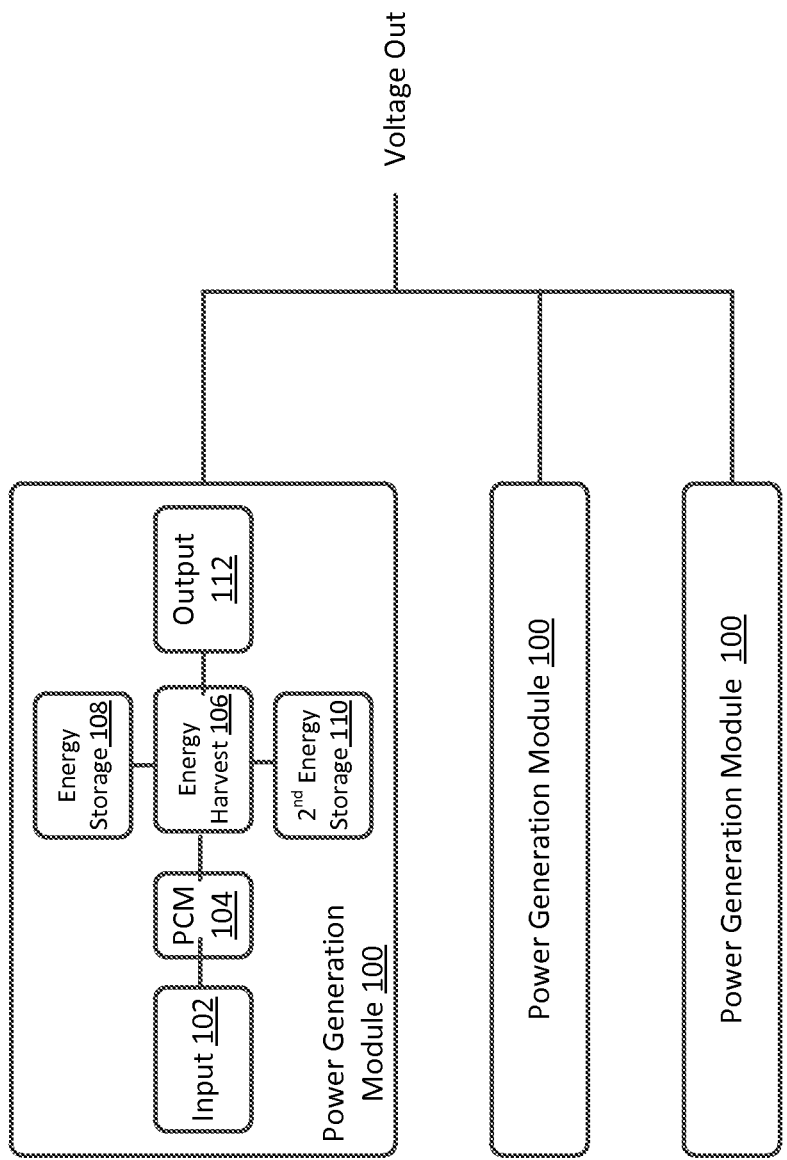
FIG. 1 illustrates a logical block diagram of a configurable power generation system, according to an example embodiment of the present disclosure.

FIG. 1 illustrates a schematic of an exemplary power generation system 10 in accordance with an example embodiment of the present disclosure. The power generation system 10 includes a collection of one or more power generation modules 100. In the embodiment shown, the power generation modules 100 are connected in parallel to an output voltage; details regarding modular interconnection of such modules are discussed in further detail below. In the embodiment shown, each of the power generation modules 100 includes an input 102, a power conditioning module 104, an energy harvesting circuit module 106, a primary (short term) energy storage system 108, a secondary (long term) energy storage 110, and a programmable output circuit 112.

Input 102 includes a power source and/or energy conversion device. The power source can be one or more of a thermoelectric generator (TEG), photovoltaic or solar panels, vibration, wind, or other energy generation sources. In a particular example embodiment useable in an oilfield application, the input 102 can correspond to a thermoelectric generator applied to a conduit such as an oil pipe, which generally has a temperature differential comparing the conduit to a natural (environmental) temperature. As used herein, "thermoelectric generator" may refer to any devices known to those of skill in the art which convert a temperature differential directly into electrical energy.

In embodiments, one or more thermoelectric generators can be utilized as inputs to the power generation modules 100. The thermoelectric generators used in embodiments of the disclosed system 10 can be configured in a "stacked" arrangement and can operate at a low differential temperature (e.g., less than about 10-15 degrees Fahrenheit). The thermoelectric generators can be modular and scalable such that the power generation system can be installed anywhere with temperature changes or difference. Details regarding the arrangement of thermoelectric generators are provided below in connection with FIGS. 13-15.

Figure 4:
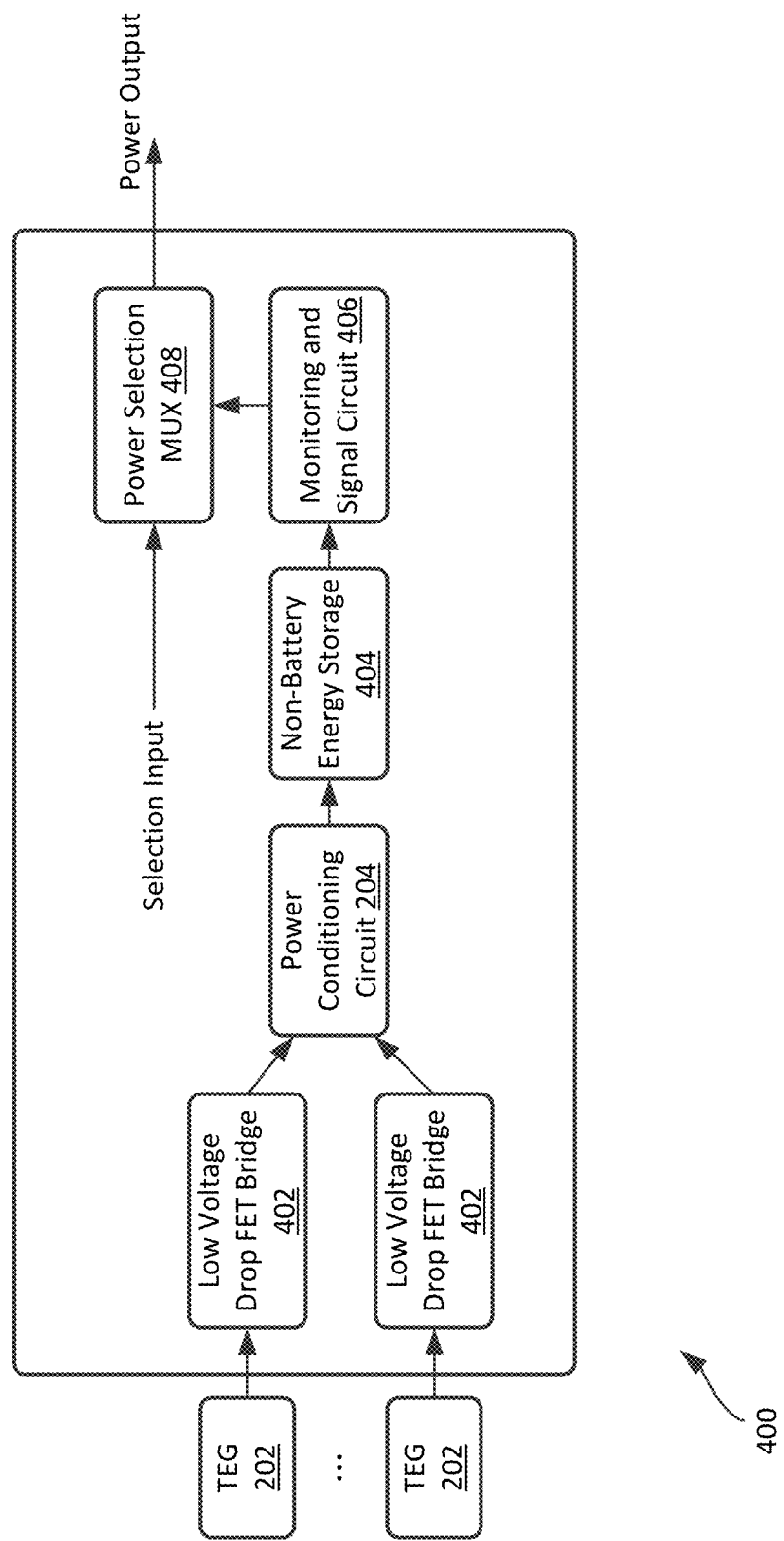
FIG. 4 illustrates a block diagram of a power conditioning module useable within the power generation system of FIG. 1, in a third example embodiment.

The power conditioning module 104 can, in some embodiments, include a bridge circuit (as illustrated in FIG. 4 below) which enables reversible potential difference received from the input 102. In one embodiment, the specialized bridge circuit includes a low-voltage drop field-effect transistor FET. For example, specialized bridge can be integrated at the input to allow the hot side and the cold side of thermoelectric generators to be reversible. This allows the power conditioning module 104 to take advantage of the thermal energy stored in equipment that the thermoelectric generator is attached to. As such, the specialized bridge enables reversible potential difference such that additional power can be extracted from a heat source, especially when the source is generating lower levels of heat.

The power generation module 100 includes an energy harvesting circuit module 106 which, in some embodiments, includes one or more power conditioning circuits. Multiple instantiation of a power conditioning circuit provides high efficiency energy harvesting as well as built-in redundancy and uninterrupted operation. Power conditioning module 106 can be configured in a simple circuit as a multiplexed comparator or other logic circuit, such that there is no need for a separate control circuit, which would otherwise itself require power. In an example embodiment, energy harvesting circuit module 106 includes a circuit that compares the power outputs received from the one or more power sources of programmable input 102. The circuit can be configured to select and use the power outputs received from the one or more power sources with the greatest amount of energy with minimal power overhead. In one embodiment, the circuit may include a Schmitt trigger and gate switch for selecting the power output with the greatest amount of energy with minimal power overhead.

The primary (short term) energy storage system 108 and secondary (long term) energy storage 110, provide energy storage management for robust operation of equipment through severe conditions. For example, short term energy storage systems 108 can include a one or more capacitors, which store and provide a large current out for high power needs. In embodiments, the primary (short term) energy storage system 108 can be inserted between and at the end of a chain to provide high output current. Secondary (long term) energy storage 110 is typically used for backup energy storage and can include an ultra-capacitor with low leakage. Secondary (long term) energy storage 110 provide limited current out and are used to maintain output voltage when the short-term storage is depleted. In embodiments, independent long term energy storage modules can be utilized to provide longer life capacitance. In example embodiments, both short-term and long-term energy storage 108, 110 can be provided by way of capacitor banks.

The programmable output circuit 112 defines an output of the power generation module 100, and provides a wide range of output voltage for higher generality, nominally between 3.3-25V or otherwise as may be required. Programmable output circuit 112 can be manufactured using commodity step-up chipsets. Programmable output circuit 112 enables unlimited scalability by connecting the outputs of multiple power generation modules to respective inputs (or a ground plane) of neighboring modules, as further discussed below in connection with FIGS. 7-8. Typically, and by way of background, there is energy overhead of approximately 7-15% depending on the voltage and current of the output.

Figure 2:
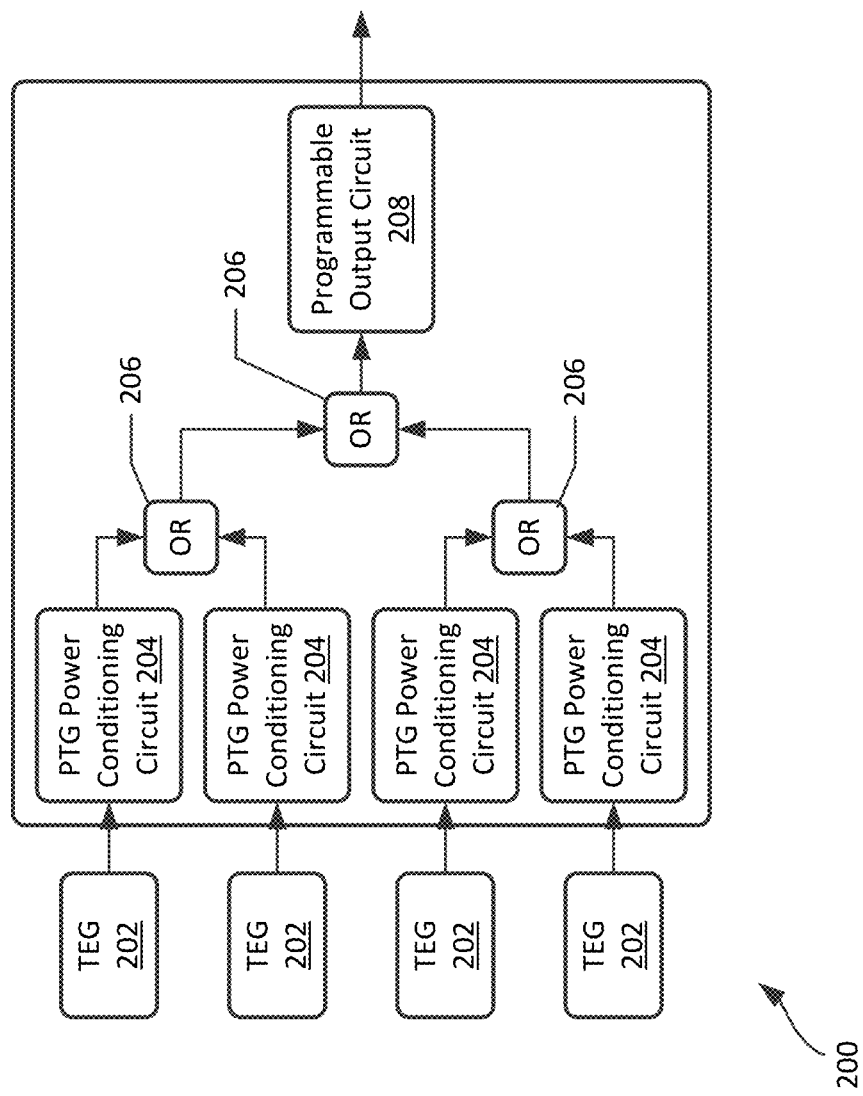
FIG. 2 illustrates a block diagram of a power conditioning module useable within the power generation system of FIG. 1, in an example embodiment.
Figure 5A:
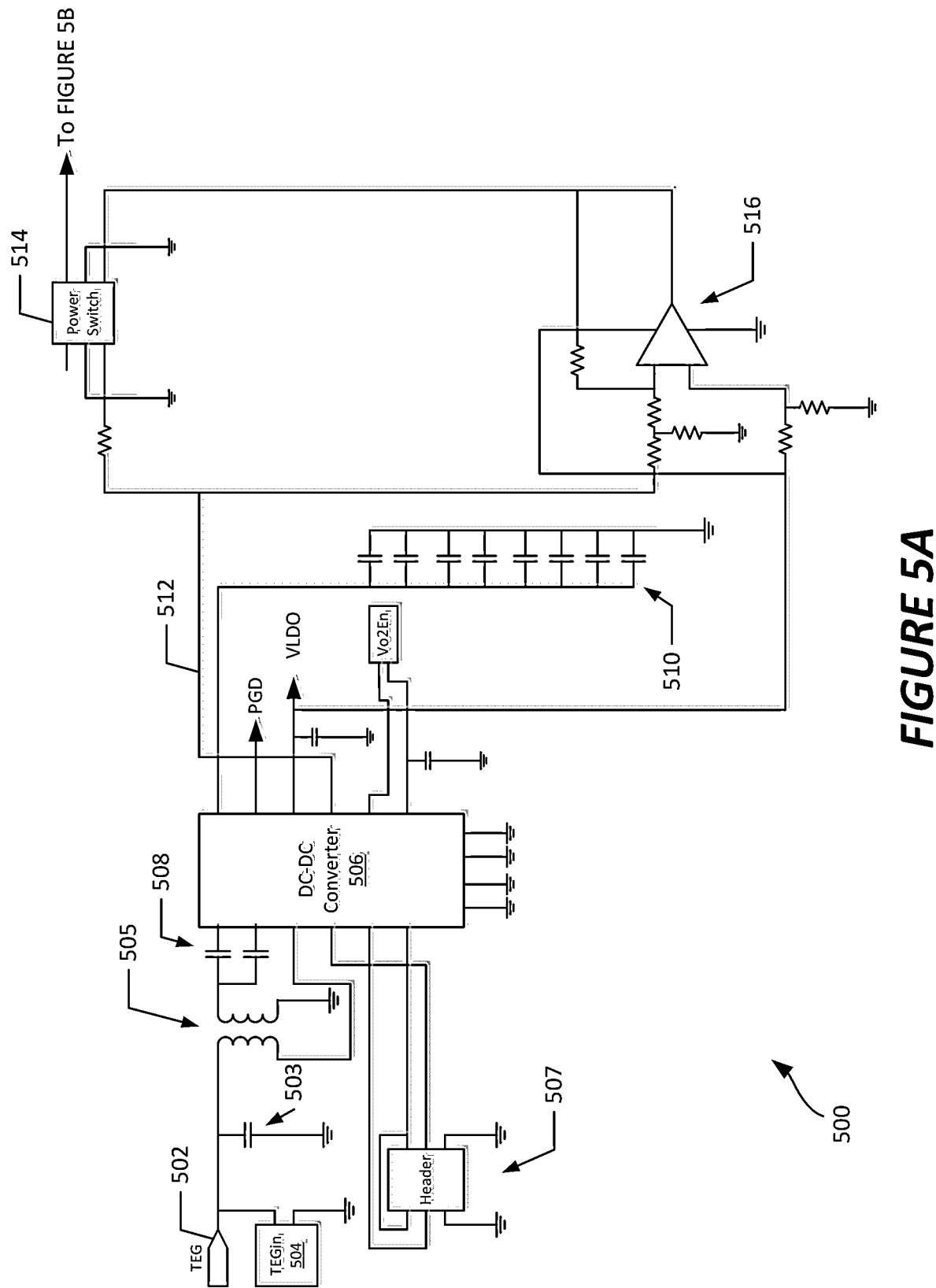
FIGS. 5A-5B illustrate a general schematic diagram of a circuit useable within a power conditioning module and including a power conditioning circuit, according to an example embodiment.
Figure 5B:
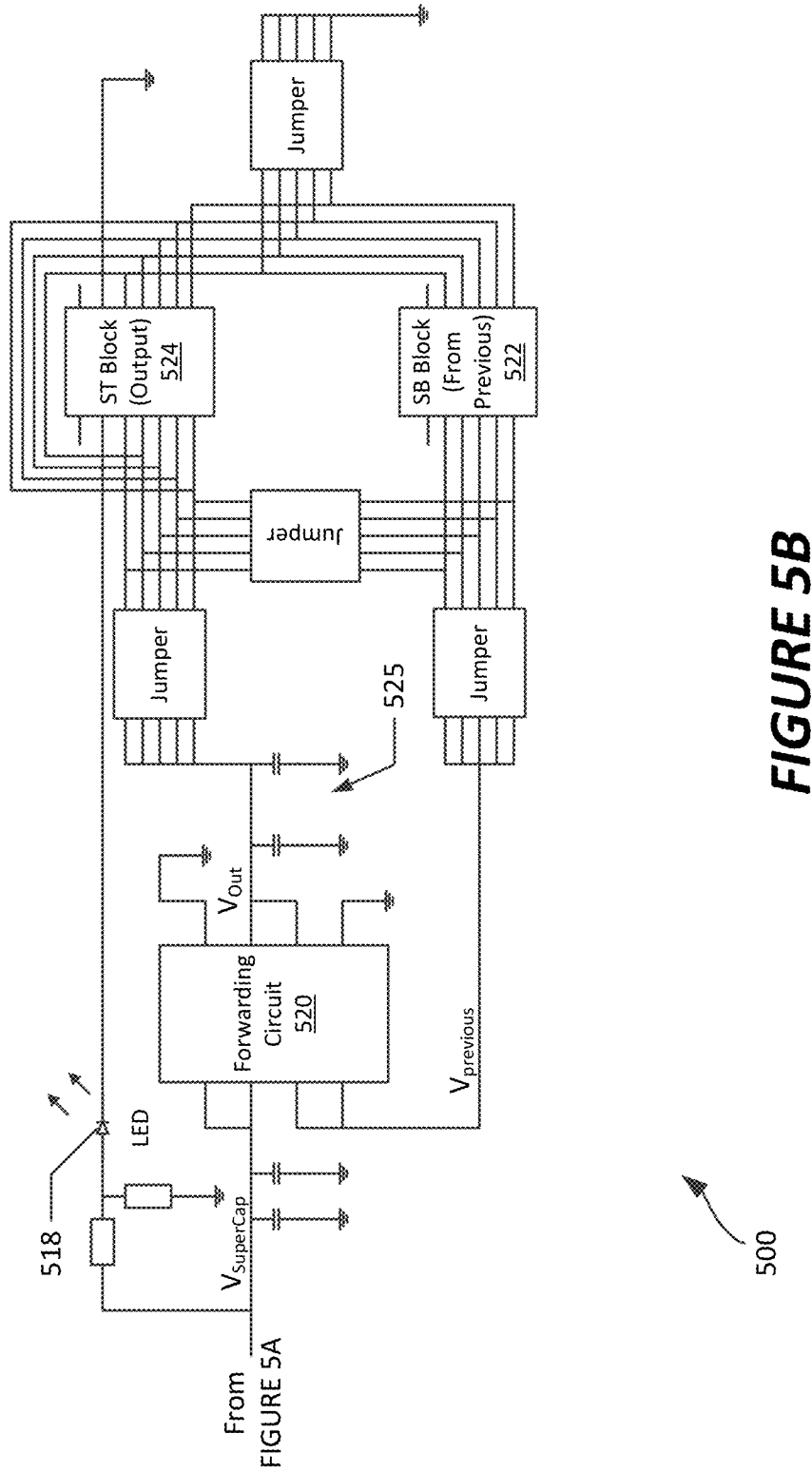

FIG. 2 illustrates a block diagram of a power conditioning module 200 useable within the power generation system of FIG. 1. In some embodiments, the power conditioning module 200 can correspond to one or more of the power conditioning modules 104 of FIG. 1. In the embodiment shown, the power conditioning module 200 receives voltages from a plurality of thermoelectric generators 202, each of which is electrically connected to a power conditioning circuit 204. The power conditioning circuit 204 of FIG. 2 is generally configured to provide a polarity (orientation) of a voltage signal received from the associated thermoelectric generator 202, and capture energy based on the voltage generated by the thermoelectric generator 202, for storage in an energy storage unit (e.g., one or more capacitors, as discussed in further detail below). An example embodiment of a power conditioning circuit 204 is illustrated in FIGS. 5A-5B, below.

In the embodiment shown, the power conditioning module 200 is configured to interconnect the power conditioning circuits 204 by one or more logic circuits 206. The logic circuits 206 are configured to receive at least two signals and select a higher power level (as indicated by output voltage) from between those two signals. In the embodiment shown, the logic circuit 206 are arranged in a tree configuration in which two power conditioning circuits 204 directly feed to one of the logic circuits 206; with four such power conditioning circuits 204, there are two "first level" logic circuits, and a single "second level" logic circuit that receives as input signals the outputs from the respective "first level" logic circuits 206. The output of the second level logic circuit 206 is provided to a programmable output circuit 208, which, in the embodiment shown corresponds to output circuit 112 of FIG. 1.

Figure 3:
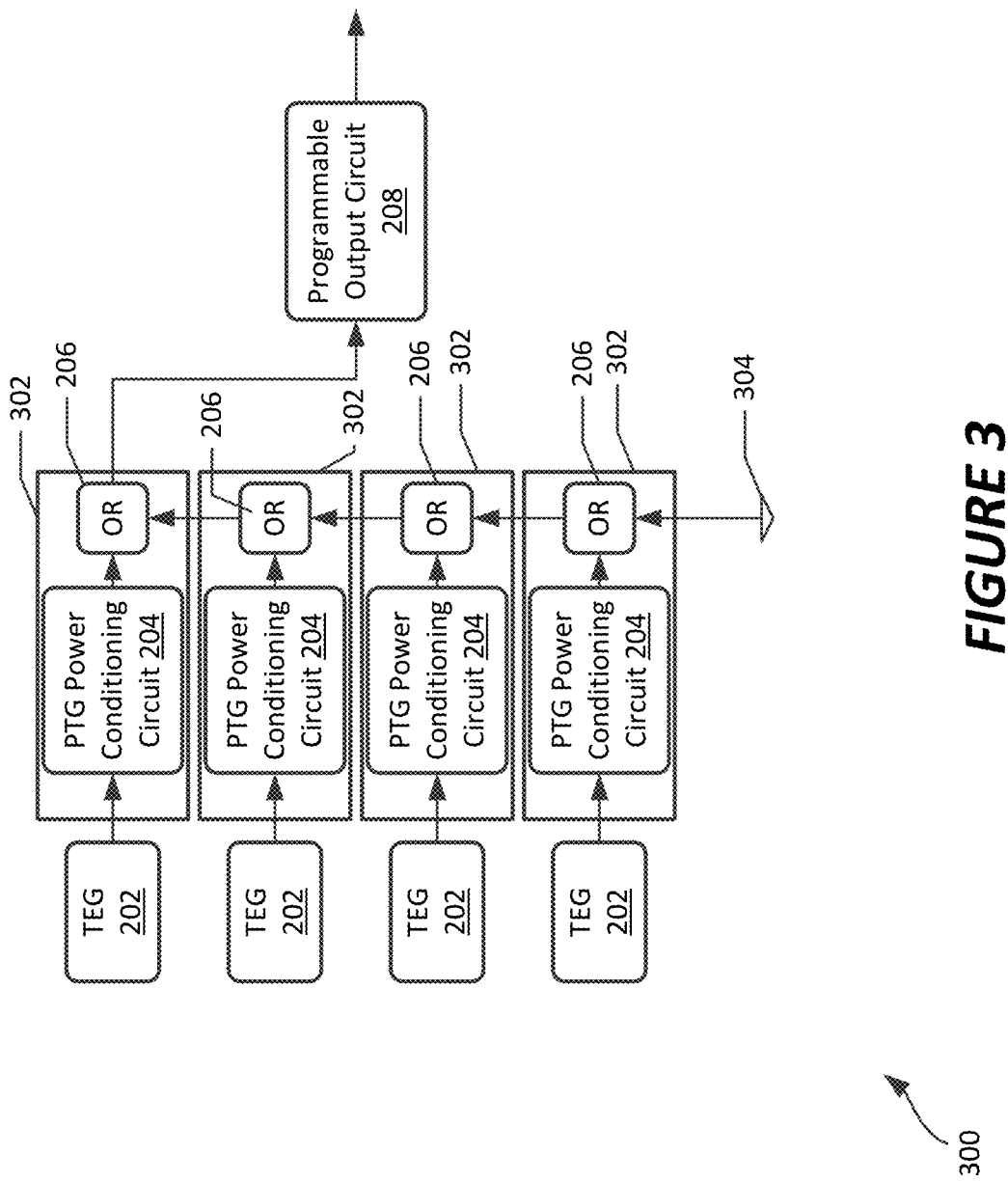
FIG. 3 illustrates a block diagram of a power conditioning module useable within the power generation system of FIG. 1, in a second example embodiment.

In contrast to the power conditioning module 200 of FIG. 2, as illustrated in FIG. 3, a power conditioning module 300 is illustrated that includes a cascaded arrangement of submodules 302, each having logic circuits 206 that are each associated with a single power conditioning circuit 204 (which is again, in turn associated with a corresponding thermoelectric generator 202. In the embodiment of FIG. 3, each of the logic circuits 206 receives a first signal from the associated power conditioning circuit 204, and a second input signal from either (1) a prior power conditioning module or ground connection, in the case of a first-arranged logic circuit 206, or (2) from a prior logic circuit. In this arrangement, each logic circuit 206 compares between a prior logic circuit (if any), or if no prior logic circuit exists, it compares the output of the associated power conditioning circuit 204 with a local ground connection 304. The output of the final cascaded logic circuit 206 is connected to the programmable output circuit 208. In further contrast to FIG. 2, the configuration of FIG. 3 minimizes the number of logic circuits 206 required for proper operation.

As illustrated, the power conditioning module 300 utilizes the highest power outputs received from the one or more power sources. By comparing the output of each of the power conditioning circuits, the power level of each power conditioning circuit 204 can be determined. The programmable output circuit 208 then automatically selects and uses the power conditioning circuit 204 with the greatest amount of energy with minimal power overhead. By using a simple circuit effectively representing a comparator and a multiplexer, there is no need for a separate controller, and thus less power is consumed.

Figure 7:
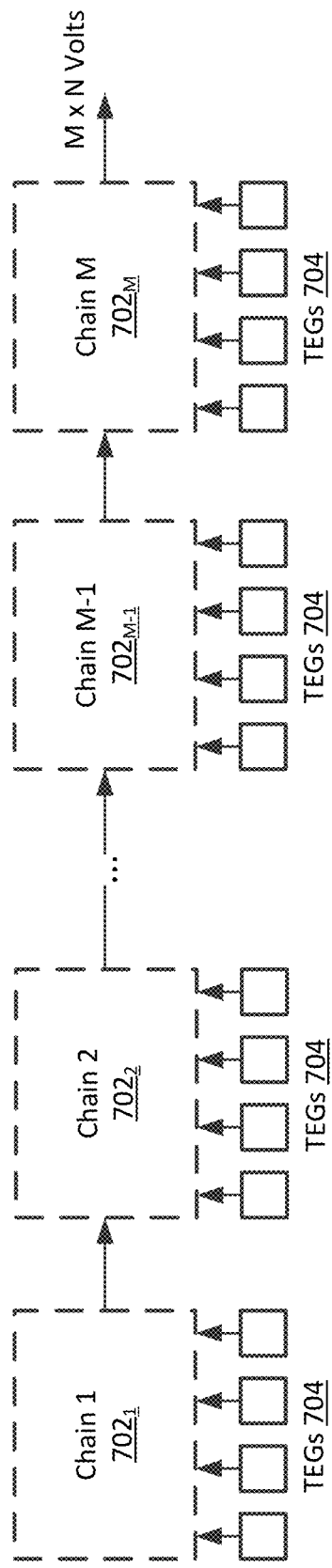
FIG. 7 illustrates a chain of power conditioning units, according to an example configuration.
Figure 8:
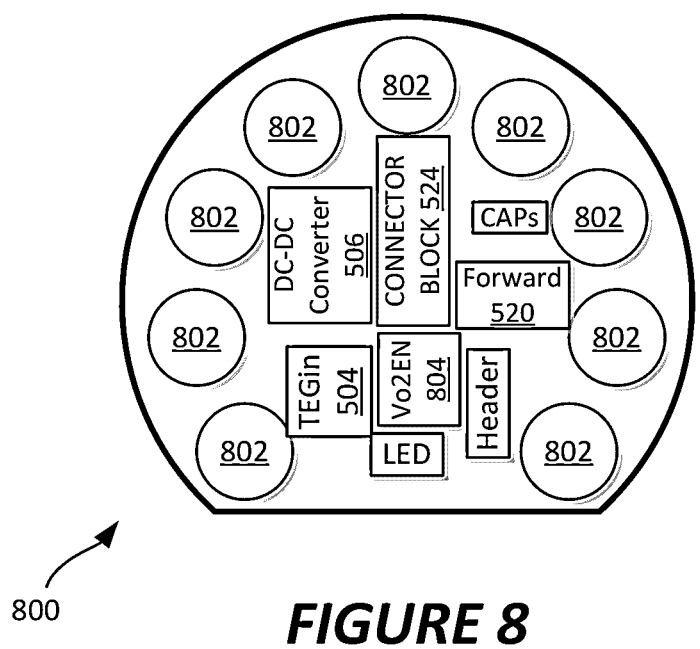
FIG. 8 illustrates an example circuit board layout for a power conditioning circuit.

It is noted that, as illustrated in FIGS. 7-8 below, the local ground 304 can in some cases be connected to an output of a prior power conditioning module 300, such that the local ground is already at a threshold voltage (e.g., about 8 volts). In this case, the output of the chained power conditioning module 300 would add to that maximum voltage, and so forth, so that chained modules provide linear voltage scaling.

Referring to FIG. 4, a block diagram of a power conditioning module 400 useable within the power generation system of FIG. 1 is shown. The power conditioning module 400 is depicted to illustrate additional details and optional features of a power conditioning circuit as discussed above. The power conditioning module 400 therefore corresponds to a further embodiment of a power conditioning module, such as module 104.

In the embodiment shown, the power conditioning module 400 includes a bridge circuit 402 interfaced between the thermoelectric generators 202 and a power conditioning circuit 204. In this example each of the bridge circuits 402 can correspond to a low voltage drop FET-based bridge circuit useable to provide an oriented voltage signal to the power conditioning circuit 204. In particular, the bridge circuits 402 can include a plurality of diodes and a switching FET arranged to ensure a voltage signal of a known polarity regardless of the temperature gradient (positive or negative) experienced by the associated thermoelectric generator 202.

In the embodiment shown, the power conditioning circuit 204 is electrically connected to a non-battery energy storage unit 404. The non-battery energy storage unit can be, for example a series of supercapacitors configured to capture and store a power signal from the power conditioning circuit 204. A monitoring and signaling circuit 406 is connected at the non-battery energy storage unit 404, and monitors a charge level of the non-battery energy storage unit 404. Once the voltage at the monitoring and signaling circuit 406 reaches a predetermined threshold, the circuit 406 passes the signal to a power selection multiplexer 408. The power selection multiplexer corresponds, in some embodiments, to the "OR" operation of the logic circuit 206 of FIGS. 2-3. In this case, a signal from a secondary power conditioning circuit, either of the same type or some other type (e.g., battery, solar, vibration sensor, etc.) can be provided for comparison, with the power selection multiplexer 408 selecting a higher of the two input values as a main power output signal 410.

Referring now to FIGS. 5A-5B, an example of a circuit 500 useable within a power conditioning module 100-400 of FIGS. 1-4, above, is shown. In particular, the circuit 500 as shown includes a power conditioning circuit as discussed above.

FIG. 5A illustrates a first portion of the circuit 500, interfaced to a power source such as a thermoelectric generator. In the embodiment shown, a thermoelectric generator signal 502 (referenced as "TES") provides an input voltage signal, which can, in some embodiments, be received at a TEGin header connector 504. The signal is smoothed by a capacitor connection 503 following the input, and passed through a transformer 505 and to a DC-DC converter 506 via capacitive (non-current) connections 508, and to a switch connection 509 of the DC-DC converter 506. Concurrently, a header connection block 507 provides a voltage to the DC-DC converter 506, for example from another power module, or for connection to an additional input array (e.g., as may be connected to a bridge circuit as mentioned above.

The DC-DC converter 506 gathers energy from very low input voltage sources, such as the thermoelectric generator discussed above, and converts that energy to usable output voltages, such as for powering sensors and communication equipment. Such applications typically require much more peak power, and at higher voltages, than the input voltage source can produce. In some embodiments, the DC-DC converter 506 is configured to provide at least a 200 milliwatt startup power delivery, even though average power required to be drawn from a thermoelectric generator may not exceed about 4-8 milliwatts.

It is noted that the combination of the DC-DC converter 506 and the thermoelectric generator is configured to accumulate and manage energy over a long period of time to enable short power bursts for acquiring and transmitting data. The bursts must occur at a low enough duty cycle such that the total output energy during the burst does not exceed the average source power integrated over the accumulation time between bursts. From the DC-DC converter 506, an output voltage is provided to a capacitor bank 510. The capacitor bank includes a plurality of high-capacity capacitors, such as super capacitors. In the embodiment shown, a set of eight supercapacitors are included in the capacitor bank 510, and can, for example, each have a capacity of about 330 mF. Other storage capacities could be used in alternative embodiments of the present disclosure, depending upon the required storage capacity.

In operation, once the stored voltage reaches a threshold, the DC-DC converter 506 selectively enables one or more output voltage connections 512 based on the current energy levels stored at the supercapacitors. In the example embodiment shown, the output voltage is provided to a power switch 514 and to an amplifier circuit 516 (forming a Schmitt trigger), useable to determine when the output voltage is at a level adequate to enable the power switch 514 (e.g., a transistor-based switch). When the output voltage from the DC-DC converter 506 reaches a specified voltage level, the power switch is enabled, providing power output at the signal line labeled "To FIG. 5B". In an embodiment, the specified voltage level may range from about 1 V to about 20 V, alternatively from about 2 V to about 10 V, alternatively from about 4 V to about 6 V. That transistor stays active until the voltage drops below a threshold (in one example case, about 3V).

In FIG. 5B, the power signal from the power switch 514 is provided to a light emitting diode 518, indicating that power is available from the circuit (e.g., from the capacitor network 508), and the power signal is also provided to a forwarding circuit 520. The forwarding circuit compares the power signal, shown here as $V_{SuperCap}$ to a voltage signal, shown as $V_{previous}$. The voltage signal is received at circuit 500 from an input connection block 522 (labeled SB Block). The output signal of the forwarding circuit 520 (shown as $V_{out}$) is routed via a jumper network to an output connection block 524 (labeled as labeled ST Block), for connection to a subsequent circuit (e.g., for comparison to a subsequent power signal at a forwarding circuit 520 of a next-chained circuit 500.

In some embodiments, the forwarding circuit 520 is configured to only cause a switch between the inputs $V_{SuperCap}$, $V_{previous}$ if there is a voltage difference of about 0.4 volts. This reduces the effect of a ping-ponging operation that may occur among the various modules. Additionally, one or more capacitors 525 connected to the output of the forwarding circuit 520 act to smooth voltage fluctuations (if any) when switching among power sources.

Figure 6:
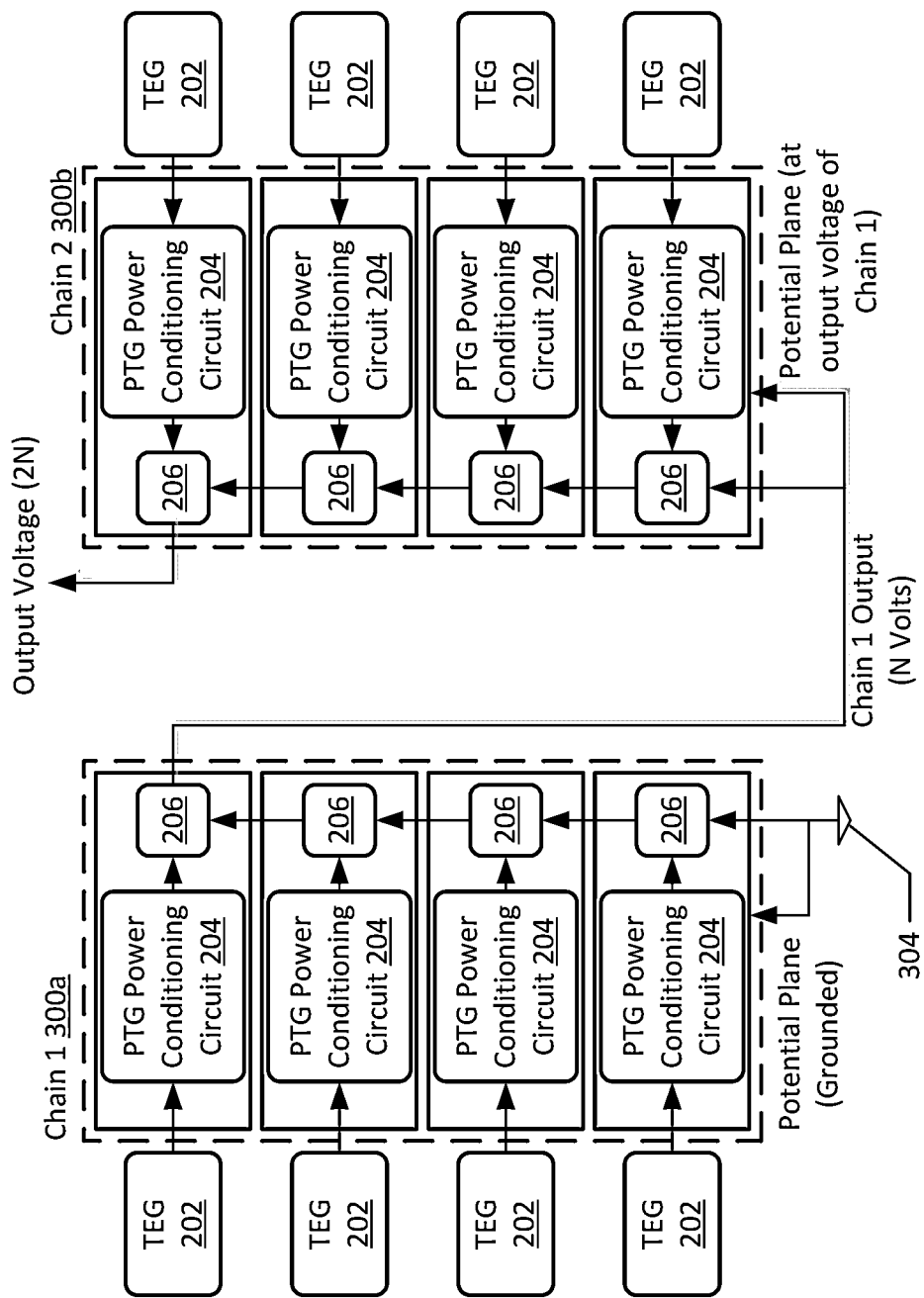
FIG. 6 illustrates an example schematic stacked arrangement of two power conditioning units.

Referring now to FIGS. 6-7, arrangements in which a plurality of power generation modules are chained to provide additional storage capacity, or higher delivered voltage, are provided. In particular the arrangements of FIGS. 6-7 could, in various embodiments, be implemented using any of the power modules such as modules 100-400 of FIGS. 1-4, which could optionally implement the circuit 500 of FIG. 5.

Referring specifically to FIG. 6, an example chain 600 of two power generation units 300a-b is shown. In this example, the power generation units are configured as the power generation units 300 of FIG. 3; however, in alternative embodiments, other types of power generation units could be used. As illustrated, a first power generation unit 300a has a first logic circuit connected to a local ground 304; however, the output of the first power generation unit is electrically connected to the first logic circuit of second power generation unit 300b. It is noted that the output signal from power generation unit 300a is provided both as a local ground of power generation unit 300b and as an input to the first logic circuit 206 of that power generation unit 300b. This allows the local voltage comparison by the logic circuit 206 to establish a voltage difference relative to the local ground, thereby ensuring that the voltage output by power generation unit 300b is in addition to the voltage provided by power generation unit 300a. It is noted that, in alternative embodiments where the output of power generation module 300a is electrically connected only to the first logic circuit 206 of module 300b but not to its local ground, power generation module 300a-b simply become redundant of each other. This provides additional power delivery capacity, but providing no higher a voltage at the output of power generation module 300b.

Referring now to FIG. 7, an arrangement 700 is shown that uses a plurality of power generation modules $702_{1-M}$ chained in series, to create an additive voltage. The arrangement shown can use any of the power generation modules 100-400 of FIGS. 1-4 as a power generation module 702.

In the embodiment shown, each power generation module $702_{1-M}$ is associated with a plurality of thermoelectric generators 704. These thermoelectric generators can be, in some embodiment, positioned in a stacked configuration. Discussion of such a configuration is illustrated in FIGS. 12-15, below.

It is noted that, in the arrangement 700, the output of a first power generation module $702_1$ is provided to the local ground and to a first logic circuit of the second power generation module $702_2$, and so on, such that each power generation module 702 provides additive voltage. Since there is a nearly linear scaling, the ultimate output voltage from the chain of power generation modules is N (the output voltage,)×M (the number of chained power generation modules). N may be any suitable voltage. However, in embodiments, N may range from about 1 V to about 20 V, alternatively from about 2 V to about 10 V, alternatively from about 4 V to about 6 V.

Referring now to FIGS. 8-11, example physical characteristics of a power generation module are shown, illustrating one example implementation of the circuits and concepts discussed above. FIG. 8 illustrates an example circuit board 800 illustrating a layout of circuit components thereon. In particular, the circuit board 800 is adapted to be used in a stacked arrangement in which a collection of similar circuit boards can be interconnected, analogous to the interconnection of power conditioning circuits and logic circuits in FIG.

3. In particular, the circuit board 800 is configured to implement the circuit 500 of FIGS. 5A-5B in a way that provides for convenient interconnection to neighboring circuits.

In the embodiment shown, the circuit board 800 has a plurality of supercapacitors 802 disposed around an outer periphery, which form the capacitor bank 510 of FIG. 5. A TEGin input connector header 504 can receive a signal from a thermoelectric generator, as noted above. A Vo2En header 804 corresponds to the analogous header illustrated in FIG. 5A, and can be used to monitor an output voltage as needed. Generally, the remaining components are as illustrate and described above in connection with FIGS. 5A-5B.

Notably, in the embodiment shown, a connector block 806 is provided on the circuit board 800, and corresponds to the output connection block 524 of FIG. 5. Additionally, a complementary connector block on an opposite side of the circuit board can correspond to input connection block 518. Preferably, the output connection block 524 has a height that is above the remaining circuit components on the board 800, such that, by stacking circuit boards 800, electrical connection can be made between adjacent circuits, for purposes of comparing voltage levels of the supercapacitors 802 at forwarding circuits 520 on each board.

Figure 9:
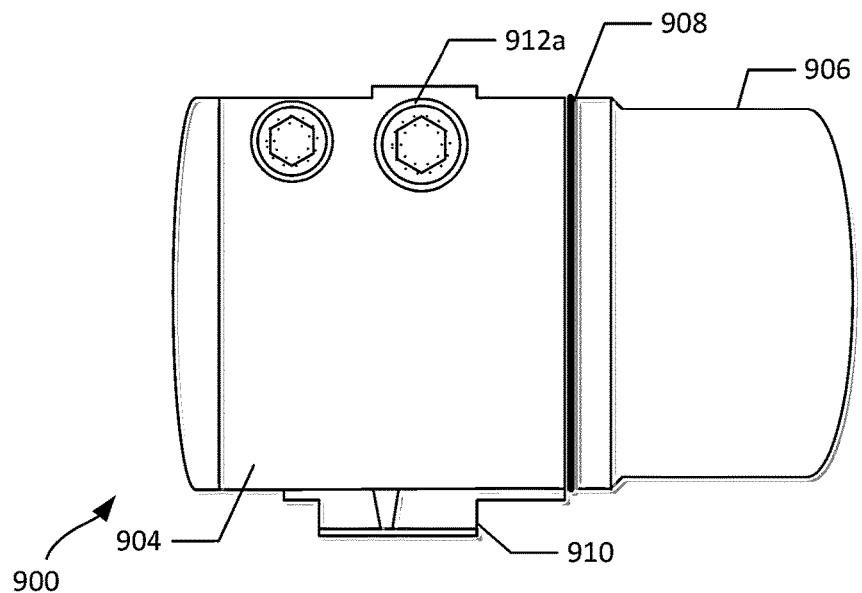
FIG. 9 illustrates an example enclosure in which a plurality of power conditioning circuits can be maintained.
Figure 10:
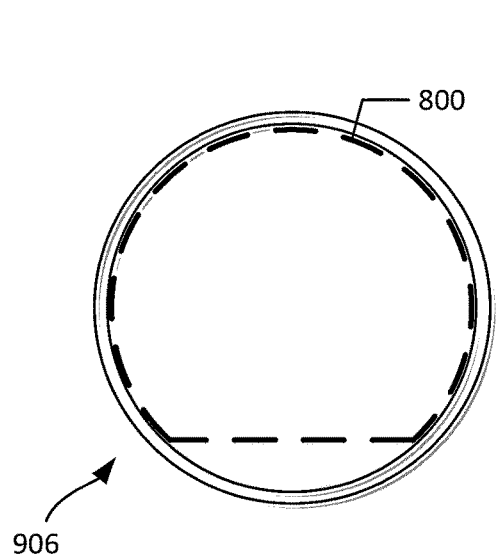
FIG. 10 illustrates a schematic positioning of the circuit board of FIG. 9 within the enclosure of FIG. 9, in an example embodiment.
Figure 11:
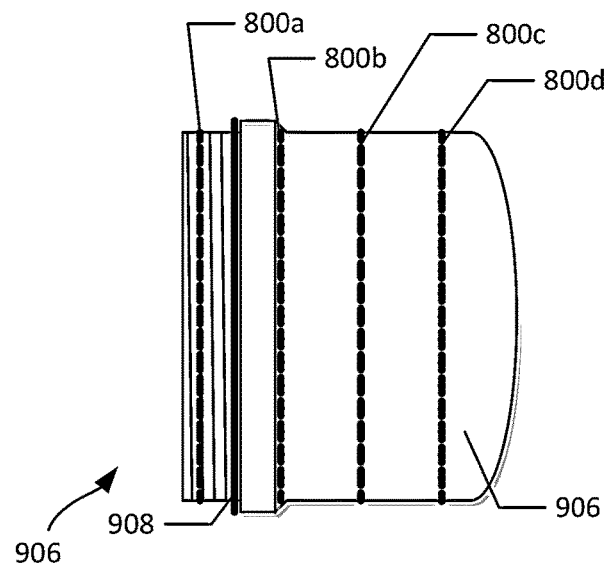
FIG. 11 illustrates a schematic positioning of a set of stacked circuit boards within the enclosure of FIG. 9, in an example embodiment.

As seen in FIGS. 9-11, in a constructed power generation module as disclosed herein, a set of circuit boards 800 can be placed within a housing 900. The set of circuit boards 800 can, in the embodiment shown, a stacked arrangement of four circuit boards 800*a-d*. The housing 900 is generally cylindrical to accommodate the generally round circuit boards 800, and includes an interior volume 902. The housing 900 includes a separable base 904 and cap 906 forming the interior volume 902. A threaded seal 908 joins the base 904 and cap 906, and forms an environmental seal allowing the housing 900, and enclosed circuit boards 800, to be used in a variety of environments, including a subsea, subterranean, or other outside environment.

In the embodiment shown the housing 900 includes a mounting plate 910 formed in the base 904, as well as a plurality of connection locations 912*a-b*. The connection locations 912*a-b* can be used, for example, to route wires to the circuit boards 800*a-d*, for example from a thermoelectric generator, to/from adjacent power generation modules, or to/from sensors and/or communication equipment that are intended to use the power generated by such a power generation module.

Generally, as shown, the circuit boards 800*a-d* are positioned within the cap 906; in such cases, other types of equipment, such as batteries (where used), sensing equipment, or other components can be located within the portion of the interior volume 902 formed by the base 904. However, in alternative embodiments, the circuit boards 800*a-d* can be otherwise located, or could take up additional space within the interior volume 902.

It is noted that the stacked circuit board alignment disclosed in FIGS. 8-11 allows for aligned connectors, thereby allowing any number of circuit boards 800 to be added to a particular chain. Accordingly, although four boards are discussed as used in a stacked configuration herein, it is recognized that other numbers of circuit boards could also be used. Furthermore, by connecting a top board in a specified configuration to the various headers included on that board, either the four circuits could be used in a chained sequence, or two boards each could be included in separate chained sequence, providing the same amount of power, but with half the voltage and also providing redundancy.

Referring now to FIGS. 12-15, additional details regarding chaining of thermoelectric generators, and use with associated generation units, is discussed in further detail.

Figure 12:
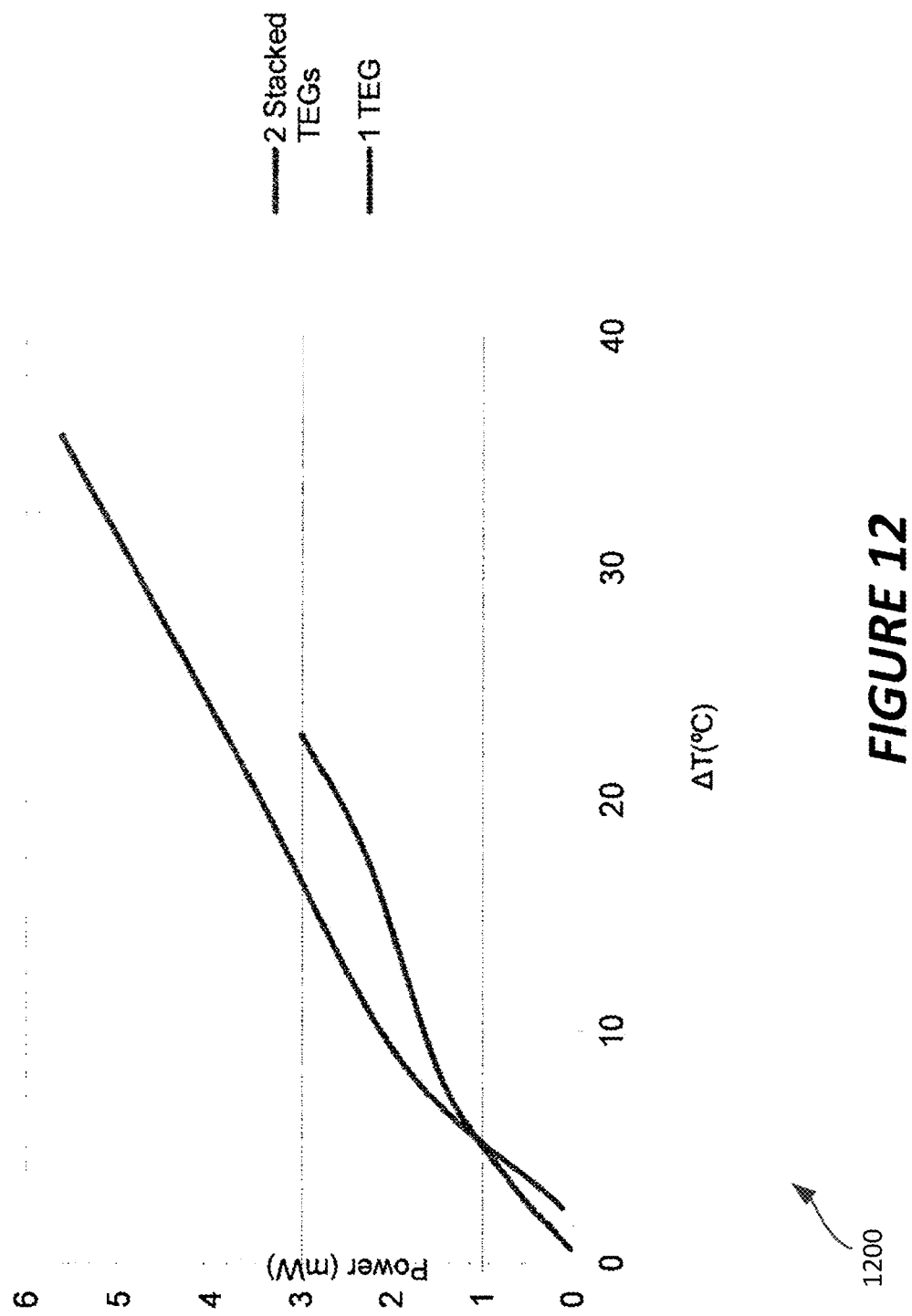
FIG. 12 illustrates a graphical representation of power delivery from stacked thermoelectric generation units.

FIG. 12 illustrates a chart 1200 that compares the power output of two stacked thermoelectric generators according to an embodiment of the present invention compared to a single thermoelectric generator for a range of temperature differentials. As illustrated in the chart 1200, two stacked thermoelectric generators allows for generally linear scaling of voltage generated, and therefore power that can be provided to a circuit, such as any of the circuits described above in connection with FIGS. 1-5. Furthermore, even at a similar temperature, a stacked arrangement can provide a greater voltage difference than a single thermoelectric generator, indicating that it is not just at high temperature differences that such an arrangement is advantageous. Rather, as discussed in further detail in connection with an example experiment below, a thermoelectric generator can be configured to generate power based on a difference in temperature of ranging from about 10 degrees to about 30 degrees Fahrenheit, alternatively from about 10 degrees to about 15 degrees Fahrenheit. More particularly, in an embodiment, the thermoelectric generator may be configured to generate nearly a milliwatt with a temperature differential of about 10 degrees Fahrenheit.

Figure 13:
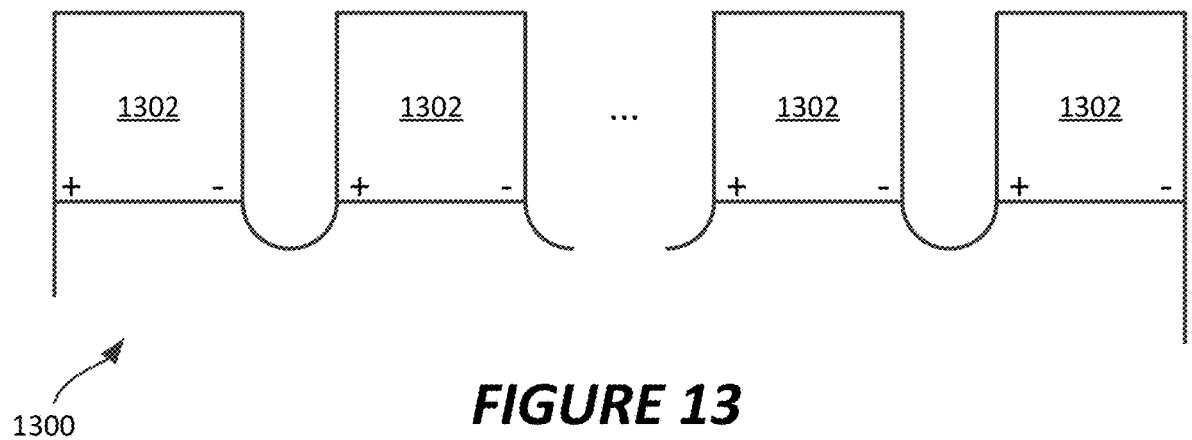
FIG. 13 is a schematic depiction of a set of chained thermoelectric generation units useable in connection with the power conditioning units to form a power generation system, according to an example embodiment.
Figure 14:
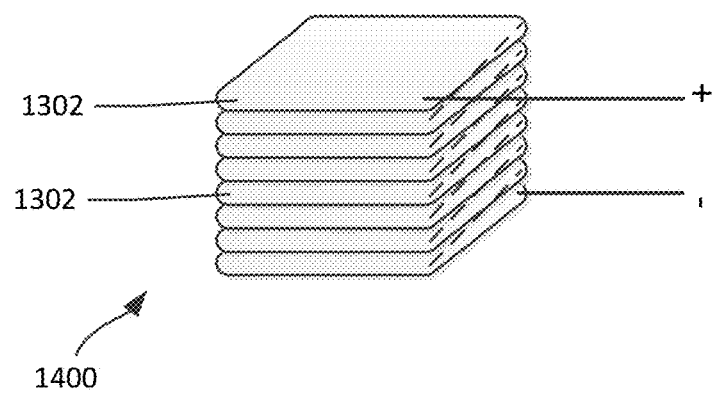
FIG. 14 illustrates the thermoelectric generation units of FIG. 13 in a stacked configuration, in an example embodiment.

FIG. 13 is a schematic depiction of a set 1300 of chained thermoelectric generation units 1302, useable in connection with the power conditioning units to form a power generation system, according to an example embodiment. As shown in FIG. 13, each thermoelectric generation unit 1302 is electrically connected in series to multiply the voltage generated by each individual unit, based on the observations noted in FIG. 12. Accordingly, a stack 1400 of such chained thermoelectric generation units 1302 is depicted in FIG. 14.

In connection with the set 1300 of stacked TEG units 1302, it is noted that this stack can in some cases act as a heatsink, given the fact that many such units are stacked on top of each other. This is particularly the case where the difference in temperature across which the TEG units are applied is relatively low (below about 10 degrees Fahrenheit). Accordingly, there is a saturation point beyond which further stacking of TEG units 1302 is unproductive. This saturation point is observed at the point where a maximum amount of energy is harvested from a heat differential; if additional TEG units 1302 are stacked beyond that maximum, the additional TEG units will draw heat from the stack, and therefore the existing TEG units will be exposed to a lower temperature differential (and therefore will generate less energy.

In addition, in some embodiments, insulation can be placed around a set 1300 of stacked TEG units 1302. This operates to minimize unconverted heat from escaping via sides of the stacked TEG units, thereby increasing a rate of conversion from heat to electricity.

Figure 15:
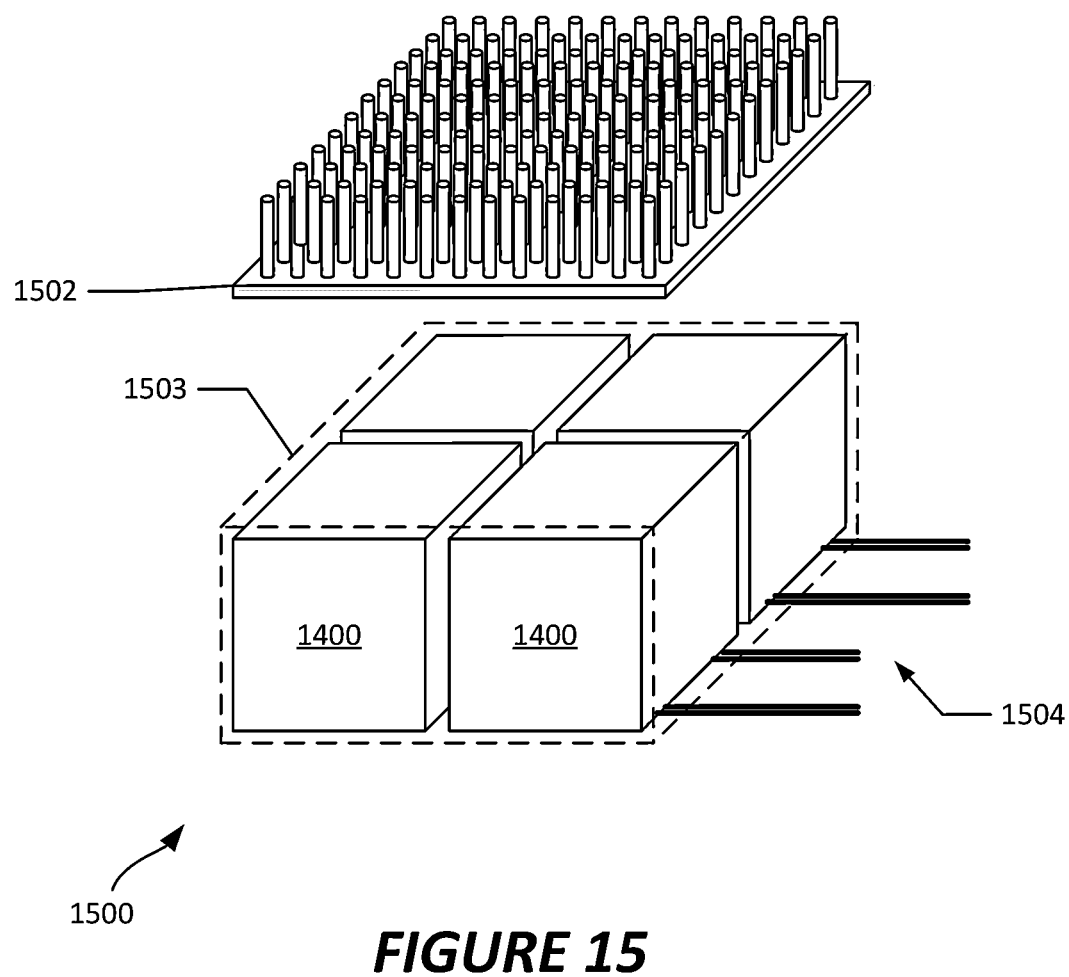
FIG. 15 illustrates an example configuration in which a set of stacked thermoelectric generation units can be packaged for use within the power generation system as discussed herein.

FIG. 15 illustrates an example configuration 1500 in which a set of one or more stacks 1400 thermoelectric generation units can be packaged for use within the power generation system as discussed herein. In this embodiment, a heatsink 1502 is mounted onto a set of one or more stacks of thermoelectric generation units. The thermoelectric generation units as disclosed herein can be mounted (e.g., via a clamp or other arrangement) to a pipe in an oil field facility. In some alternative embodiments, a clamping arrangement, and a portion of the pipe itself, can be used as the heatsink, to minimize the risk of theft of the thermoelectric generators and other associated equipment. Optionally, the stacks 1400 can be placed within an enclosure 1503 to which the heatsink(s) are attached. Leads 1504 from each of the stacks 1400 of thermoelectric generation units 1302 can be routed to a power generation module for energy capture as discussed above.

Referring generally to the overall arrangement discussed in connection with FIGS. 1-15, it is noted that the power generation modules discussed herein, and in particular the embodiments of FIGS. 5 and 8-15 have been tested in association with a sensor arrangement, in particular a Rosemount pressure transmitter. It is noted that any equivalent sensor/transmitter circuitry could also be used. Furthermore, it is noted that embodiments of the disclosed power generation system may be used to power any devices known to those of skill in the art.

EXAMPLE

In the example test setup shown, the Rosemount pressure transmitter can accept an input voltage of about 5.5-6 Volts, or up to 44 volts. Accordingly, a set of stacked power modules provides adequate voltage levels for that component. It is also noted that the capacitors are selected to support power needs of that transmitter. In particular, it was observed that a startup operation of the Rosemount pressure transmitter requires about 200 mW of power, while periodic operation of the Rosemount pressure transmitter once initialized may require an additional 50-60 mW. In an example operation, the Rosemount pressure transmitter is configured to activate every eight seconds for testing and communication, leading to an average power consumption of about 4-8 mW.

In particular, the above described power generation system was used to generate electric power for the above-described Rosemount pressure transmitter over a four week period without error. The power generation system as implemented included double (chained) power conditioning modules (i.e., 4 PC boards total) that were connected to stacked thermoelectric generators fixed to an oil pipe with a "hot side" at approximately 105° F. and a temperature difference of 10-15° F. Other preliminary tests have shown operation of the Rosemount pressure transmitter with a temperature differential of approximately 4-10° F. The power generation module 100 was configured such that each circuit board was connected in series to allow for redundancy through modular stacking, as well as increased capacity. Additionally, the thermoelectric generators were stacked, as discussed above. The stacking of the thermoelectric generators reduces the surface area required for installation of the power generation system, and allows the extraction of about 50% more power for each additional thermoelectric generator, as noted in FIG. 12. The power conditioning modules were used to condition the harvested electricity and trickle charge a 28.2 milli-farad capacitor bank (acting as the energy storage system in this test example). The capacitor was used for the start-up circuit of the Rosemount pressure transmitter, which may also be used with a step-up circuit for more efficient operation.

It was noted that, during operation, and in particular when Rosemount pressure transmitter required bursts of electricity, the capacitors were discharged quickly. However, since the pressure transmitter did not require such bursts often, adequate power was supplied.

As will be appreciated by one skilled in the art, the size of capacitors can be determined based on the energy needs, and in particular the energy burst needs, of the instruments. The forwarding chain as discussed herein allows for automated selection of the electricity storage component (i.e., capacitor) best able to supply that energy, depending on how much energy was available in the capacitors. Here, the capacitor with the greatest amount of energy was selected. As the energy was drained from a capacitor, a voltage drop may occur, depending on the amount of energy required by the pressure transmitter. The forwarding chain then provided an automatic switching to a "fresher" (higher charged) capacitor to maintain the required input voltage of the Rosemount pressure transmitter.

As noted in the experimental results discussed above, and with respect to the systems of FIGS. 1-15 generally, it is noted that the power generation module discussed herein provides a number of advantages, in particularly with respect to oil field applications. For example, as noted above, a temperature difference of about 10-15 degrees Fahrenheit can be sufficient to generate energy to be used with many types of sensors, whereas in previous systems, temperature differentials of 40-50 degrees would be required. Furthermore, the power generation modules disclosed herein can be readily configured in a modular fashion to select a desired voltage output level, capacity, and redundancy, by selecting and selectively interconnecting such modules. Furthermore, because the logic required to select from among the power generation units is built into the units themselves, there is no requirement of a separate controller, which would otherwise require its own power source for operation.

The foregoing detailed description of the invention, examples, and illustrative embodiments illustrate a preferred mode of carrying out the invention. It will be clear to those skilled in the art that other embodiments and obvious modifications, equivalents and variations of the invention can be employed and adapted to a variety of fluid catalytic cracking systems. Such modifications, alterations and adaptations are intended to be included within the scope of the appended claims.

The invention claimed is:
1. A power generation system comprising:
a plurality of energy conversion devices for generating a plurality of power signals based on one or more sensed environmental conditions;
a plurality of power conditioning circuits, each coupled to one or more of the energy conversion devices, the plurality of power conditioning circuits for receiving the plurality of power signals and storing energy in an energy storage system, each power conditioning circuit including
a power regulator converter to receive at least one of the plurality of power signals and charge an energy storage device with the at least one of the plurality of power signals and convert at least one of the power signals to first output voltage;
the energy storage device charged by the first output voltage, and
a power switch controlled by an enable signal provided by the power regulator converter; and
a selection circuit coupled to a first power conditioning circuit and a second power conditioning circuit from among the plurality of the power conditioning circuits, the selection circuit receiving the first power conditioning signal from the first power conditioning circuit and a second power conditioning signal from the second power conditioning circuit, the selection circuit including logic circuits configured to select a higher power level from the received first conditioning circuit signal and the second power conditioning signal.

2. The power generation system according to claim 1, wherein the energy storage device comprises a rechargeable energy storage device.

3. The power generation system according to claim 1, wherein the energy storage device includes a plurality of supercapacitors.

4. The power generation system according to claim 1, further comprising a bridge coupled to at least one of the power conditioning circuits for enabling a reversible potential difference.

5. The power generation system of claim 1, wherein at least one of the energy conversion devices is selected from a group of energy conversion devices consisting of:
   a thermoelectric generator;
   a photovoltaic device;
   a vibration detection device; and
   a wind detection device.

6. The power generation system of claim 5, wherein the energy conversion devices are configured to provide power with a temperature differential of no more than 10 degrees Fahrenheit.

7. The power generation system of claim 1, wherein the energy conversion devices include a thermocouple, the thermocouple configured to generate power signals based on a temperature difference between a hot environment and a cold environment of about 10 degrees Fahrenheit.

8. The power generation system of claim 1, wherein the plurality of power conditioning circuits and the selection circuit form a first power module having a first reference ground connection and a first power module output connection.

9. The power generation system of claim 8, further comprising a second power module having a second reference ground connection and a second power module output connection, and wherein the first reference ground connection of the first power module is connected to ground and the second reference ground connection is connected to the first power module output connection, thereby providing a power output at the second power module output connection representing a summed voltage of the first and second power modules.

10. The power generation system according to claim 1, wherein each power conditioning circuit includes a DC-DC converter.

11. The power generation system according to claim 10, wherein each power conditioning circuit includes a bridge circuit coupled to the DC-DC converter to enable a reversible potential difference.

12. The power generation system of claim 1 wherein the first power conditioning circuit includes the power switch and an amplifier circuit.

13. The power generation system of claim 1 wherein the logic circuits are arranged in a tree configuration in which two power conditioning circuits directly feed to one of the logic circuits.

14. The power generation system of claim 1 wherein the plurality of energy conversion devices includes one or more thermoelectric generators operating at a differential temperature less than about 10-15 degrees Fahrenheit.

15. The power generation system of claim 14 wherein thermal energy stored in equipment that the thermoelectric generators are attached to be extracted.

16. The power generation system of claim 1 wherein the plurality of power conditioning circuits includes a specialized bridge circuit having a low-voltage drop field-effect transistor FET.

17. A power module comprising: an
   environmentally-protective housing having an interior volume;
   a plurality of circuit boards positioned in a stacked arrangement and electrically interconnected, the plurality of circuit boards each including:
      a power conditioning circuit coupled to one or more energy conversion devices, the power conditioning circuit configured to receive one or more respective power signals from the one or more energy conversion devices and store power in a rechargeable energy storage system, each power conditioning circuit including at least one of the energy conversion devices to receive at least one of the power signals and charge an energy storage device in the rechargeable energy storage system with the at least one of the power signals converted to a first output voltage, the energy storage device in the rechargeable energy storage system charged by the first output voltage, an amplifier circuit forming a Schmitt trigger coupled to the energy storage device to determine an energy level of the energy storage device, and to forward a first power signal and to generate an enable signal when the energy level is above a predetermined threshold, and a power switch controlled by the enable signal providing the first power signal; and
   a selection circuit coupled to the first power signal of the power conditioning circuit and to a second power signal, the selection circuit generating an output power signal representing a selection from between the first power signal of the power conditioning circuit and the second power signal, the selection circuit including a forwarding circuit that forwards the output power signal based on a relative voltage level of the first power signal and the second power signal, wherein the the output power signal is provided to the power switch and to the amplifier circuit, the selection circuit including logic circuits that are configured to receive at least two signals and select a higher power level from between the at least two signals.

18. The power module of claim 17, wherein, for at least one of the circuit boards, the second power signal is connected to ground.

19. The power module of claim 17, wherein, for at least one of the circuit boards, the second power signal is connected to an output power signal of a neighboring circuit board.

20. The power module of claim 17, wherein the power module includes a reference ground connection and a power module output connection useable to form a chained arrangement of power modules.

* * * * *